United States Patent

Arvanitakis

[15] 3,705,648

[45] Dec. 12, 1972

[54] FILTRATION SYSTEM

[72] Inventor: Kostas Savas Arvanitakis, 7031 W. 63rd, Chicago, Ill. 60638

[22] Filed: March 30, 1972

[21] Appl. No.: 239,519

Related U.S. Application Data

[63] Continuation-in-part of Ser. No. 173,777, Aug. 23, 1971.

[52] U.S. Cl. ....................210/66, 100/935, 100/126, 210/73, 210/75, 210/108, 210/179, 210/188, 210/195, 210/259, 210/415
[51] Int. Cl. .............................................B01d 37/02
[58] Field of Search .........100/93 S, 126; 210/66, 68, 210/73, 75, 106, 108, 167, 179, 188, 195, 259, 415

[56] References Cited

UNITED STATES PATENTS

| | | | |
|---|---|---|---|
| 3,497,452 | 2/1970 | Arvanitakis | 210/73 X |
| 2,893,925 | 7/1959 | Victor | 210/68 |
| 3,352,763 | 11/1967 | Shields | 210/167 X |
| 3,135,193 | 6/1964 | Hunt | 210/415 X |
| 3,230,865 | 1/1966 | Hibbel et al. | 210/415 X |
| 1,709,349 | 4/1929 | Hollstein | 100/93 S |

FOREIGN PATENTS OR APPLICATIONS

| | | | |
|---|---|---|---|
| 159,525 | 3/1921 | Great Britain | 100/935 |

*Primary Examiner*—Samih N. Zaharna
*Attorney*—August E. Roehrig, Jr.

[57] ABSTRACT

Method of an apparatus for clarifying a contaminated liquid by pumping unclarified liquid through a primary filter increasing the pressure drop across the filter until such pressure reaches a predetermined level. When the pressure reaches a predetermined level, the filtration operation is interrupted, the filtration system closed, and the filter cake accumulated on the primary filters is removed. The contents of the primary filter chamber are drained to a secondary filter chamber or desludger whereat the liquid bearing the dislodged filter cake suspension from the primary filters and additional filter aid media is re-circulated through a secondary filtration system forming a filter cake on the surface thereof and clarifying the contents of the primary filter chamber drawn thereinto. The liquid in the primary filter chamber, clarified thereby, is pumped through the mixing chamber of a pre-coat feeder whereat various filter cake forming media are added thereto. The clarified liquid bearing the suspended filter aids is pumped through the primary filter chamber for re-circulation through the primary filters to form a new filter cake on the surface thereof. When the new filter cake has been formed the filtration system is automatically placed on line to clarify the liquid passing therethrough.

While the primary filter is clarifying liquid passing therethrough, the secondary filter of the secondary filtering chamber is cleansed of accumulated filter cake which settles to the bottom of the secondary filter chamber. The expended filter cake or sludge is conveyed downwardly by a central auger in the desludger chamber into a horizontal auger whereat the expended cake or sludge is conveyed to a vertical auger conveyer. The vertical auger is heat jacketed to expose the sludge to heat for solidifying the sludge to a desired consistency and expelling it into a container for disposal.

29 Claims, 10 Drawing Figures

FILTRATION SYSTEM

This application is a continuation-in-part of my earlier application, Ser. No. 173,777, filed Aug. 23, 1971, entitled "Filtration System".

BACKGROUND OF THE INVENTION

This invention relates to an improved method of and apparatus for clarifying liquids and, in particular, to a filtration system utilizing primary and secondary filtration to maximize the time in which the filtration system is cleansing the unclarified liquid and to minimize the time required to replenish the filter medium.

More specifically, this invention relates to a filtration system wherein a primary filter utilized to clarify the liquid is automatically cleansed as required and supplied with new filter media for the continued operation thereof. The expended filter media removed from the primary filter chamber, collected for disposal, and disposed of while the primary filter is returned to its filtration operation.

Filtration systems for clarifying liquids are used in many applications wherein it is desired to remove solid and chemical contaminants from a liquid prior to discharging the liquid, for example into sewers, and such systems are used in many applications. Certain types of applications (closed systems) necessitate for environmental pollution control that a liquid be clarified by the filtration system in order that it be continuously reused without discharge into sewage lines and/or subjected to a costly method of disposal. Such a closed filtration system is utilized in many applications wherein the cost of the liquid clarified is such that it would be uneconomical to finally dispose of the liquid, or the liquid is of such a nature that final disposal costs require that the liquid be utilized for many cycles prior to being expended.

In other types of applications (open systems) it is necessary for environmental pollution control that certain materials conveyed or suspended in the liquid be removed therefrom prior to discharging the liquid for disposal. The contaminants or suspended materials must then be collected for disposal in the most economical manner.

filtration systems for clarifying liquids by removing solid particles and chemical contaminants are sometimes of the type wherein a mechanical screening device is used in combination with a chemical filter to remove these contaminants. In certain applications, the mechanical screening device may be used as a support for a chemically adsorptive material such that the solid and the chemical contaminants are adsorbed on the surface of the filter. However, as the contaminants are removed from the liquid they accumulate on the surface of the filter inhibiting the flow of the liquid therethrough eventually clogging the filter and necessitating the removal of the filter cake from the filter septum. When the filter cake has accumulated to a level whereat the clarifying of the liquid is impaired, the cake must be removed requiring that the filtration process be interrupted.

In certain applications a disposable filter is utilized such that upon the filter becoming clogged, the filtration process is interrupted and the apparatus disassembled to replace the filter unit. In other applications, filter cleaning means such as brushes, scrapers and/or sprayers are used to mechanically clean the filter cake from the filter septum, or screen. In certain other applications, the filter cake is removed from the septum by a backwashing action achieved by reversing the flow of the filtrate through the filter. In each of these applications, the filter cake medium is dislodged from the septum and the suspended filter media settles in the clarified liquid.

One type of prior art device employing apparatus for dislodging filter cake from a filter surface without disassembling the filter apparatus is a dual-chamber filter. In the operation of this device, unclarified liquid is pumped to a primary filter chamber and through a primary filter mounted in the chamber leaving a filter cake deposit on the primary filter. When the accumulation of filter cake on the primary filter impairs the passage of liquid through the filter, a mechanical scraping device dislodges the filter cake from the filter and permits it to settle to the bottom of the chamber. When the accumulation of filter cake on the bottom of the chamber reaches an undesirable level, the filtering operation is interrupted and the entire contents of the primary filter chamber (including the filter cake) are pumped to a secondary or sludge filter chamber where the liquid is removed from the filter cake by a secondary or sludge filter and is returned for re-use.

There are several disadvantages in this type of apparatus. When the filter cake is dislodged from the primary filter, much of it remains in suspension in the surrounding solvent until the force of gravity causes the particles to settle to the bottom of the chamber. A waiting period is necessary before resuming the filtering operation in order to prevent the filter cake from being re-deposited on the primary filter. This waiting period results in a long delay in the filtering operation.

Another disadvantage of some prior art filtering systems is that the entire primary filter chamber must be evacuated in order to remove the sludge from the bottom of the chamber. This evacuation necessitates that the chamber be completely refilled every time the filter cake is removed before filtering can resume. Refilling the primary filter chamber creates additional delay and thus makes it impractical to evacuate the chamber. Still another disadvantage with this prior art system is that evacuation of the chamber leaves deposits of filter cake on the filter and walls of the primary filter chamber as the liquid is drained from the chamber.

Another example of a filter apparatus heretofore known comprises a primary filter and a secondary filter mounted in the same filter chamber. In the normal operation of this device unclarified liquid is pumped through the primary filter, thereby depositing a filter cake on the primary filter septum. The secondary filter, mounted at the bottom of the filter chamber, is inoperative until the primary filter is cleaned by backwashing the filter (i.e., reversing the flow of the liquid through the filter). The secondary filter at the bottom of the tank is then actuated. This backwashing causes the filter cake to break away from the primary filter and drift to the bottom of the tank. The secondary filter returns the filtrate for re-use.

The principal disadvantage of this type of apparatus is that the primary filter must be cleaned by backwashing in order to create the flow of liquid and dislodged filter cake from the primary filter to the secondary filter. Backwashing is very hard on a filter and reduces its life considerably. Most types of filters are constructed of a fine mesh screen septum supported only on the low-pressure side by a support structure, and this fine mesh screen distends and disrupts easily when subjected to pressure from its low-pressure side. Therefore, backwashing is not feasible with most types of filters.

Another disadvantage in the above-described device is that liquid passing through the secondary filter must be pumped all the way back to the filter for backwashing. consequently, it takes a long time for the liquid to flow from the secondary filter to the primary filter. Moreover, the apparatus using the filtrate must be operative during the filter cleaning operation in order to pump liquid back to the filter apparatus for backwashing, even though it is normally cyclically operated. If this cleaning operation were to be performed regularly, the machine would be pumping liquid continuously, and such continuing pumping would result in greater fatigue and greater wear then would result from a normal cyclical operation.

Still another disadvantage in this filter apparatus is that the apparatus is constructed so that the secondary filter is operative only during a cleaning cycle. During the normal filtering operation, the secondary filter is de-activated. Gravity, therefore, is the only force operative on the suspended particles to cause them to settle from the liquid in the filter chamber. This natural settling operation occurs quite slowly and most of these suspended particles are drawn from the liquid again into the primary filter, thus resulting in a rapid accumulation of filter media and contaminants both suspended and in solution on the surface of the primary filter. Therefore, frequent cleaning and harmful backwashing of the filter are required.

Another disadvantage in the filter systems described above is that filter cake is removed from the primary filters only when the filter cake begins to clog the filter. The systems are not designed for frequent cleaning and, consequently, the liquid passage openings in the primary filter must be quite large in order to avoid frequent clogging of the filter. This, of course, reduces the effectiveness of the filtering operation.

In certain other prior art apparatus using primary and secondary filter chambers, unclarified liquid is filtered through the primary chamber until such time as the filter media is expended and must be replaced. Filtration is interrupted and the filter cake removed from the septum. The unclarified liquid bearing the filter cake suspension is subjected to the high pressure within the primary filter chamber and re-circulated through a secondary filter transferring the filter cake suspension onto the secondary filter. The clarified liquid is then returned directly back to the high pressure side of the primary filter whereat it may be used to aid in removal of the filter cake from the primary filter system and/or further used or disposed of depending upon the nature of the clarified liquid.

While the above described system has been used successfully in certain types of situations, various limitations are presented which effect its commercially successful use for general pollution control/filtration applications.

Since the utilization of the prior art filtering devices described above involves either an incomplete and time-consuming cleaning process or entails the harmful backwashing of the filter, none of these devices are completely satisfactory for general use in a large scale industrial process where almost continuous operation of a filter apparatus working at peak efficiency is required.

SUMMARY OF THE INVENTION

It is, therefore, an object of this invention to improve pollution control/filtration systems.

Another object of this invention is to minimize the time required to replenish depleted filter media.

A further object of this invention is to collect entrapped impurities and expended filter cake in a manner for efficient and economical disposal.

Still another object of this invention is to improve pollution control filtration systems by filtering unclarified liquid through a primary filter, interrupting the filtration cycle when the filter media has become expended and withdrawing the contents of the primary filter chamber into a secondary filter chamber wherein the expended filter media, unclarified liquid and additional filter aids are passed through a secondary filter clarifying the liquid and causing the expended filter medium and filter aids to be deposited on the septum of the secondary filter with the clarified liquid passing into the mixing chamber of a pre-coat feeder whereat additional filter aids are added to the liquid to be passed into the primary filter chamber to coat the primary filter septum forming a new filter cake.

These and other objects are attained in accordance with the present invention wherein there is provided a method of and apparatus for clarifying contaminated liquid through the use of primary and secondary filters. Upon the expension of the primary filter media, the filter cake is removed from the primary filter and collected onto a secondary filter with the clarified liquid being re-circulated through a pre-coat mixing chamber whereat filter aids are added to facilitate filtration through the secondary filter by forming a filter cake on the septum thereof from the expended materials, contaminants and added filter aids. After the liquid is clarified, it is recirculated through the primary filter and pre-coat chamber whereat filter aids are added to form a new filter cake on the primary filter surface. The expended filter cake collected on the secondary filter is removed therefrom during the filtration process and collected in a manner for economical and efficient disposal.

DESCRIPTION OF THE DRAWINGS

Further objects of the invention, together with additional features contributing thereto and advantages accruing therefrom, will be apparent from the following description of one embodiment of the invention when read in conjunction with the accompanying drawings, wherein.

DESCRIPTION OF A PREFERRED EMBODIMENT

Figure 1:
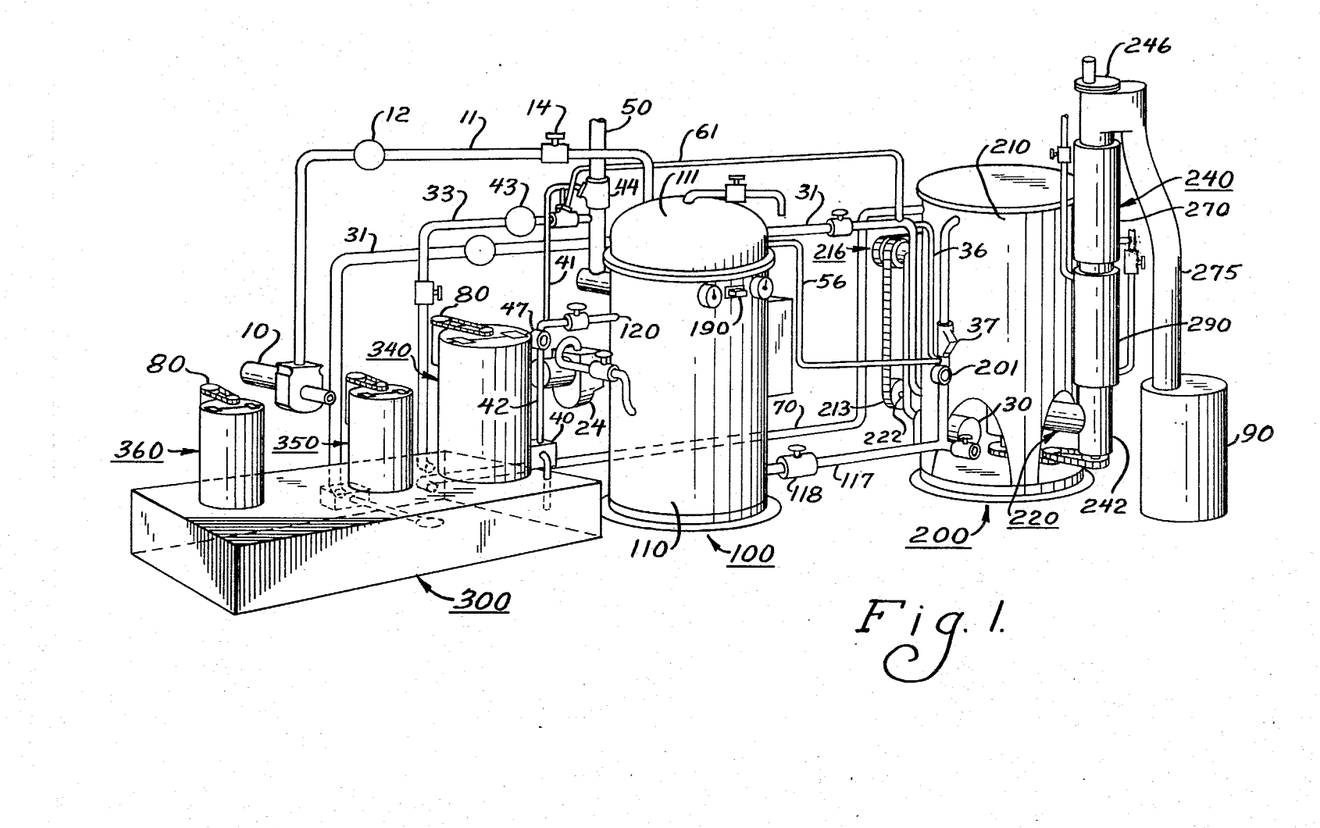
FIG. 1 is a perspective view of the invention to better illustrate the components of the filtration system.
Figures 2, 9:
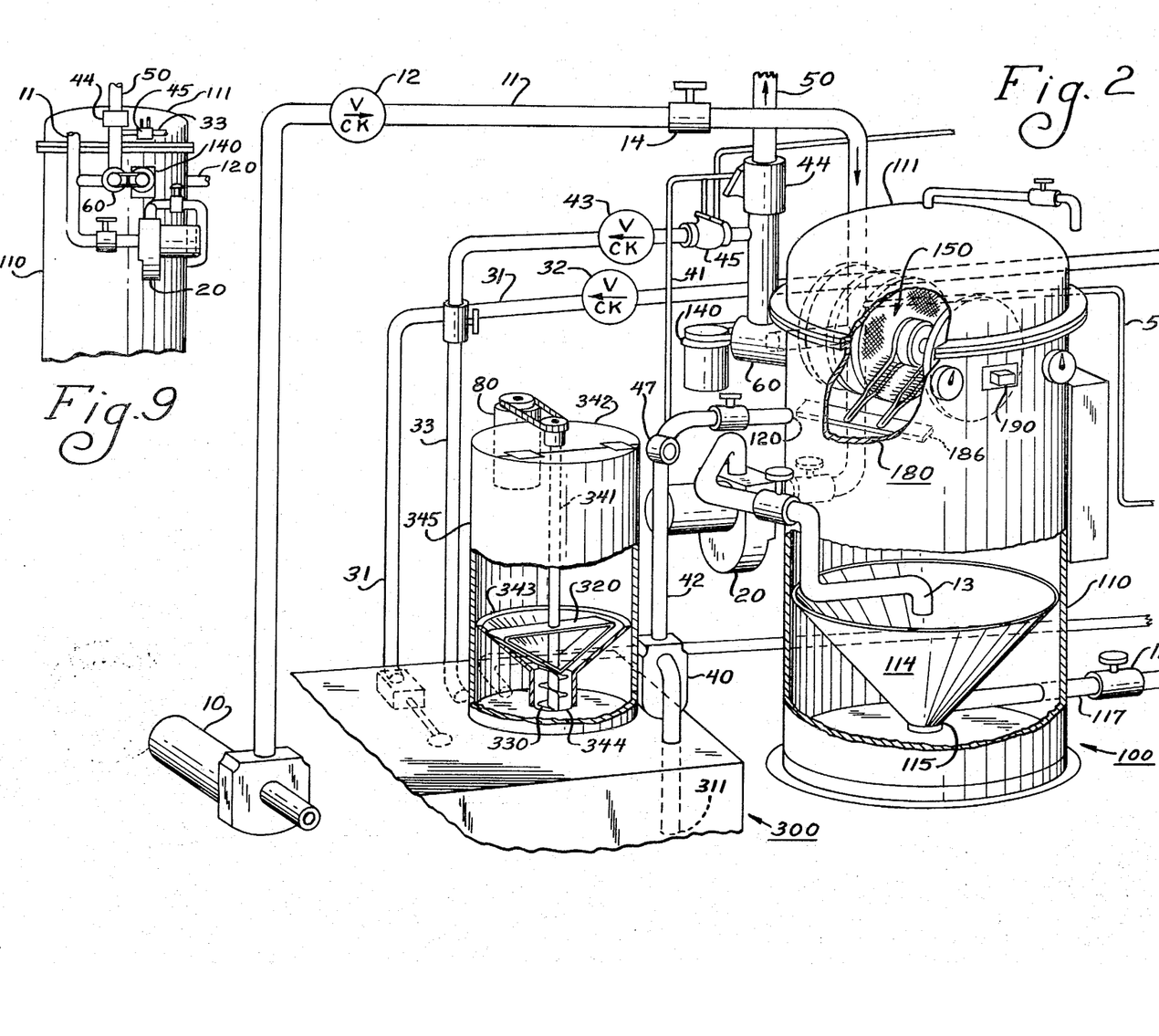
FIG. 2 is a frontal perspective view of the primary filter chamber.
FIG. 9 is a partial rear elevation of the filter outlet and piping of the primary filter apparatus.

Referring now to FIG. 1, there is illustrated the overall pollution control filtration system which is the subject matter of this invention. The filtration system includes a primary filtering mechanism 100, a secondary filtering mechanism or desludger 200 and a pre-coating apparatus 300. As best shown in FIGS. 1 and 2, unclarified liquid is drawn into the main pump 10, primary is any suitable commercially available type, and pumped through the discharge line 11 into the inlet 13 of the primary filter system 100. A check valve 12 is incorporated in the discharge line 11 to insure one-way flow of the unclarified fluid. A gate valve 14 is connected into the discharge line between check valve 12 and the inlet to the filter pump 20 to close the line for servicing. Main pump 10 and filter pump 20 operate in series to pump the unclarified liquid into the filter vessel or chamber 110 of the primary filter apparatus.

The primary filter apparatus 100 includes the filter chamber 110 enclosed at the top by a cover 111 which is removeably secured thereto to facilitate the servicing of the internal mechanisms. The liquid-tight bottom of the filter chamber is closed by a conical shaped member 114 secured within the filter chamber into which the unclarified liquid is delivered by means of the main pump 10 and the filter pump 20. An outlet 115 is formed in the bottom of the cone and connected to a discharge line 117 which delivers the material passed therethrough into the secondary filtration mechanism or desludger 200. A gate valve 118 is connected between the outlet 115 of the cone and the inlet 209 of the secondary filter mechanism 200 to provide a suitable shut-off for servicing.

Figure 5:
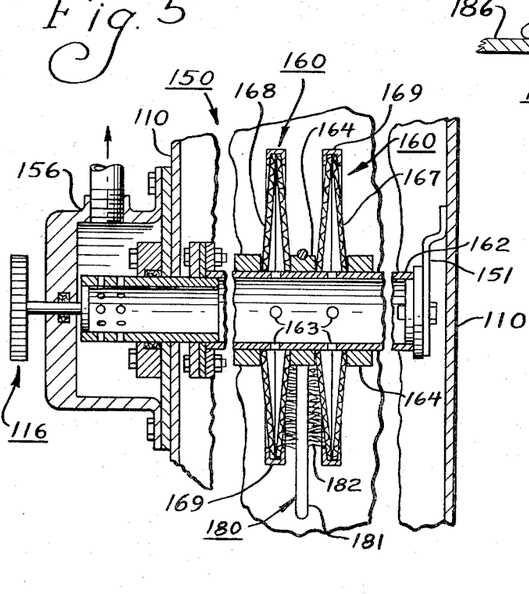
FIG. 5 is a sectional view of the filter mechanism utilized in he primary filter chamber.
Figure 6:
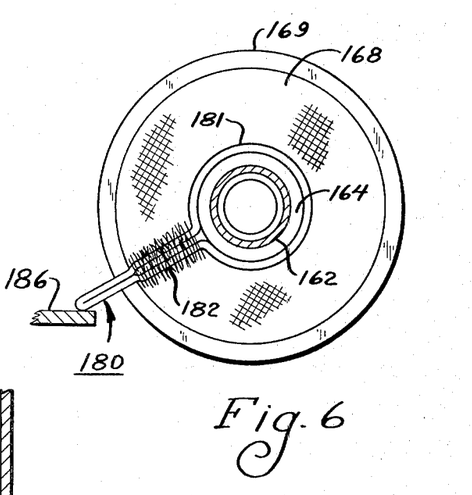
FIG. 6 is an end view of the filters shown in FIG. 5 to better illustrate the means for removing the expended filter cake and the means for withdrawing clarified fluid from the filter chamber.
Figure 7:
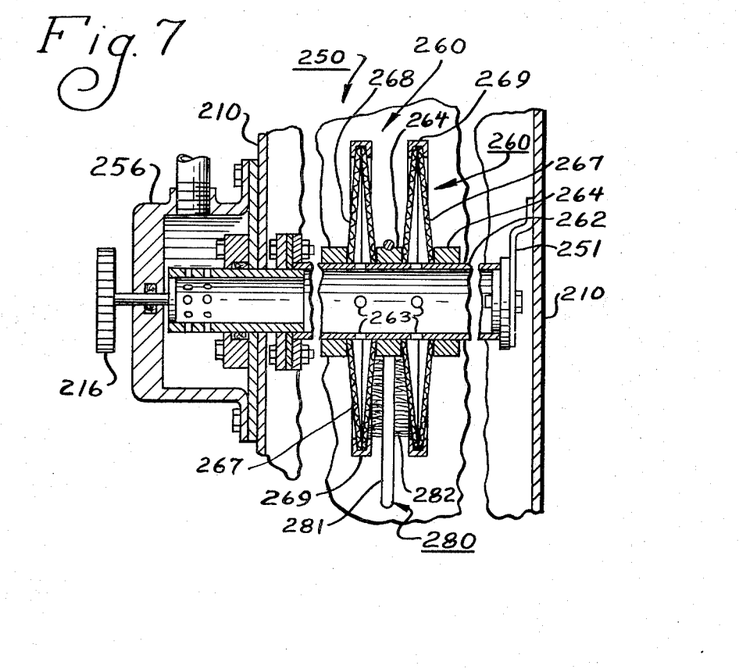
FIG. 7 is a sectional view of the filter mechanism in the secondary or desludger filter chamber.
Figure 8:
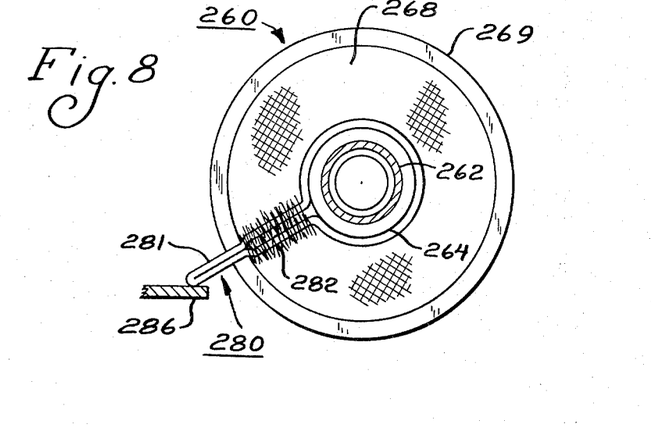
FIG. 8 is an end view of the filters shown in FIG. 7 to better illustrate the means for removing the accumulated sludge and other materials from the filter mechanism.

The unclarified liquid entering into the primary filter apparatus 100 is clarified by means of a filter system 150 and passes out from the filter chamber 110 through the filter outlet 50 to be re-cycled or disposed of, or to be passed to the pre-coat system 300 depending upon the particular phase cycle the apparatus is performing which is to be hereinafter discussed in detail. The filter mechanism 150 includes a hollow filter tube 162, formed in two sections to facilitate removal from the chamber 110, rotatably mounted in a filter bracket 151 secured to the filter chamber 110 and in a sealed bearing housing 156 at the opposite end. As best shown in FIG. 5, the filter tube 162 if closed at both ends and has perforations 153 formed therein through which the clarified liquid passes out from the filter mechanism 150.

The filter elements 160 are mounted co-axially on filter tube 162 and separated by a plurality of spacers 164 such that the perforations 163 formed in the filter tube are in communication with the interior of the filter disc. Each filter element 160 comprises a support structure or spacer 167 covered with a fine mesh screen or septum 168. The support structure 167 is a flat sheet of material folded in an accordion-like fold radiating outward from the center of the elements and tapering to a point at the outer edge. The fine mesh screen or septum 168 covering the support structure 167 is of a mesh size such that all solid particles suspended in the liquid of a size approximately 47 microns are retained on the screen when unclarified liquid is pumped through the filter element. However, the mesh size will be dependent upon the particle size of the filter aid used and the particle size of the suspended contaminants. The outer periphery of each of the filter elements 160 has a metallic rim 169 fixed thereon that slightly overlaps the screen or septum and seals the outer periphery of the filter element.

A plurality of wipers 180 are positioned between the filter elements 160 to clean the surface thereof as will be disclosed hereinafter in detail. The wipers 180 are each supported on a spacer 164 which separates the individual filter elements 160 of the primary filter mechanism so that each wiper is in contact with the opposing faces of two adjacent filter elements. When the filter elements 160 are rotated relative to the wiper 180, the relative motion between the wipers and the filter elements 160 will cause the entire surface of the filter element to be subjected to the wiping action.

Each of the wiper elements 180 includes an arm portion 181 to which brush fibers 182 are appropriately secured. The wiper arm 181 extends radially outward from the filter tube 162 and about the spacer element 164 to be supported thereby. An arm stop 186 is appropriately secured to the walls of the primary filter vessel or camber 110 to prevent the wipers from rotating when the filter tube 162 is actuated rotating the filter elements 160. Therefore, the wipers 180 will remain stationary and the brush fibers 182 will contact the entire surface of the filter elements 160 when the filter element drive 140 is actuated.

It has been found that a speed of rotation such that the relative movement between the brush fibers and the filter elements should be no greater than 1,000 inches per minute and preferably between approximately 200 and 400 inches per minute causes the expended filter cake material removed from the filter septum 168 to break off in large portions that settle rapidly from the surrounding liquid.

In operation, the main pump 10 and filter pump 20 are energized to pump unclarified fluid from the source and through the respective pumps to be discharged into the cone 114 of the primary filter. The pumping action of the two pumps pressurizes the filter vessel 110 and forces the unclarified liquid from the filter elements 160 and out the perforated filter tube 162. As the unclarified liquid flows through the filter elements 160, the contaminants are retained on the filter element cake restricting the passage of the liquid therethrough gradually increasing the pressure required to force the liquid through the filters.

SLUDGE TRANSFER PHASE

As the pressure increases, a pressure sensitive switch 190 is closed to change the operation of the filtration system to replenish the expended filter cake material supported on the septum 168. The closing of switch 190 actuates a filter drive mechanism 140 to rotate the filter mechanism 150 whereby the filter elements 150 are wiped against the stationary wipers 180. Wiping the filter 150 removes the expended filter cake from the filter septum into suspension in the unclarified liquid contained in the primary filter chamber 110.

To effect transfer of the expended filter media, the main pump 10 and the filter pump 20 are de-energized and the desludger pump 30 and the feeder pump 40 are energized. The desludger pump 30 is vacuum pump and withdraws the liquid from the desludger chamber or vessel 210 out through the desludger filter mechanism 250 through the desludger pump 30. The liquid after passing through the filter elements 250 is conveyed through discharge line 31 into the pre-coat feeder apparatus 300. A check valve 32 is positioned in discharge line 31 to insure one-way flow of the liquid traveling therethrough.

When the contents of the primary filter have been withdrawn through the outlet 115 in the bottom of cone 114 and into the secondary filtration or desludger apparatus 200, the suspended solids as well as the expended filter cake are collected onto the filter elements of filter mechanism 250. The filter mechanism 250 includes a hollow filter tube 262, formed in two sections to facilitate removal from the chamber 210, rotatably mounted in a filter bracket 251 secured to the desludger chamber 210 and in a bearing seal housing 256 at the other end. The filter tube 262 is closed at both ends and has perforations 253 formed therein.

The filter elements 260 are mounted co-axially on filter tube 262 and separated by a plurality of spacers 264 such that the perforations 263 formed in the filter tube 262 are in communication with the interior of the filter discs 260. Each filter element 260 comprises a support structure or spacer 267 covered with a fine mesh screen or septum 268. Support structure 267 is a flat sheet of material folded in an accordion-like fold radiating outward from the center of the elements and tapering to a point at the outer edge. The fine mesh screen or septum 268 covering the support structure 267 is a mesh size such that all solid particles suspended in the liquid of a size approximately 47 microns or larger are retained when unclarified liquid is pumped through the filter element. The outer periphery of each of the filter elements 260 has a metallic rim 269 fixed thereon that slightly overlaps the screen or septum and seals the outer periphery of the filter element.

A plurality of wipers 280 are positioned between the filter elements 260 to clean the surface thereof. The wipers 280 are each supported on a spacer 264 separating the individual faces of the filter element of the desludger filter discs 260 so that each wiper is in contact with the opposing faces of two adjacent filter elements. When the filter elements 260 are rotated relative to the wipers 280, the relative motion between the wipers and the filter elements 260 will cause the entire surface of the filter element to be subjected to the wiping action of the brush fibers 282.

Each of the wipers 280 includes an arm 281 to which a plurality of brush fibers 282 are appropriately secured. The wiper arm 281 extends radially outward from the filter tube 272 and about the spacer element 264 for support thereby. An arm stop 286 appropriately secured to the walls of the desludger chamber 210 prevents rotational movement of the wipers when the filter tube 262 is actuated rotating the filter elements 260. Therefore, the wipers 280 will remain stationary and brush fibers 282 will contact the entire surface of the filter element 260 when the desludger filter drive 240 is activated.

Figures 3, 10:
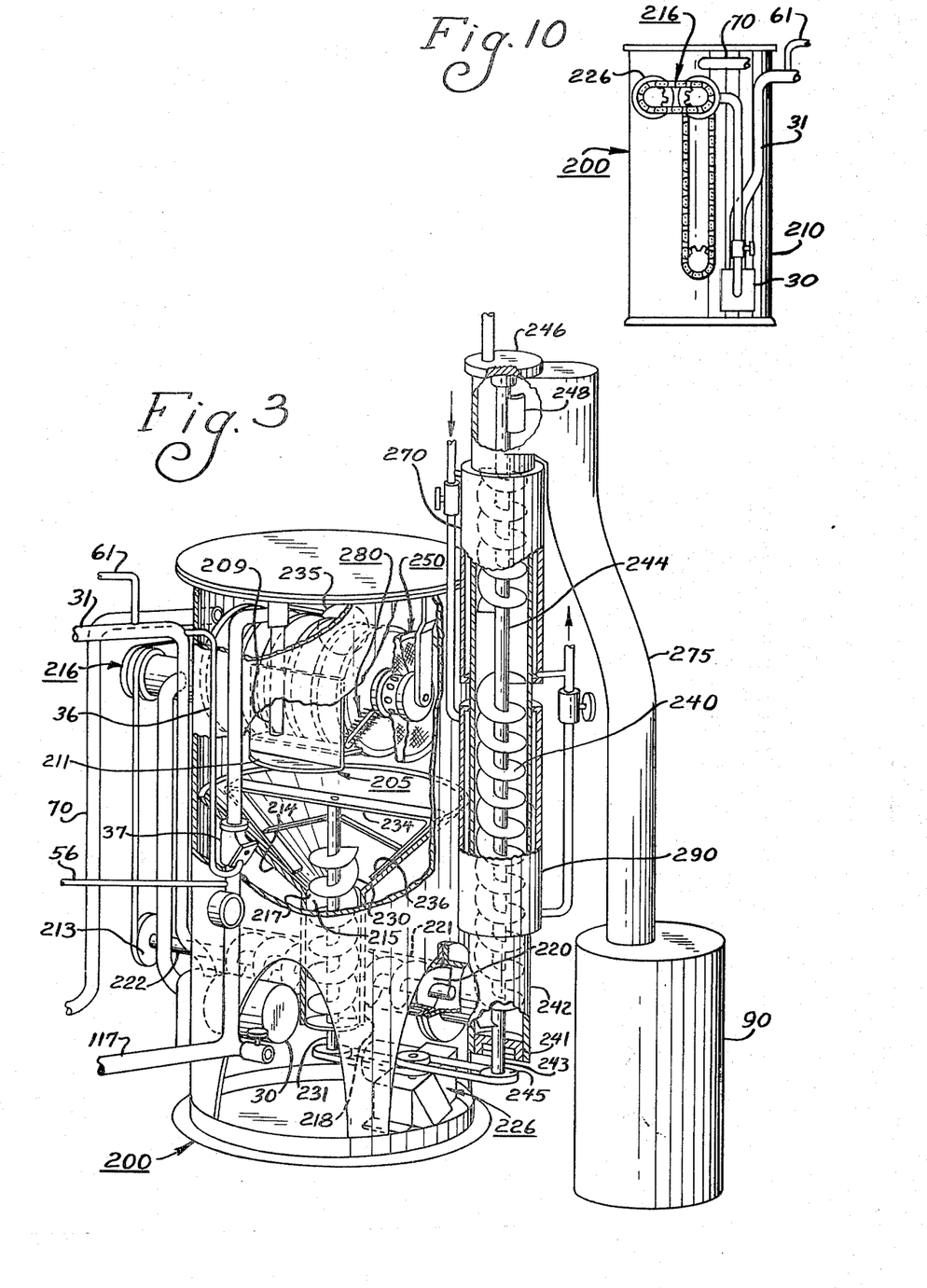
FIG. 3 is a frontal perspective view of the secondary filter chamber including the means for disposing of the collected contaminants.
FIG. 10 is a partial rear elevation of the filter outlet and piping of the desludger or secondary filter apparatus.
Figure 4:
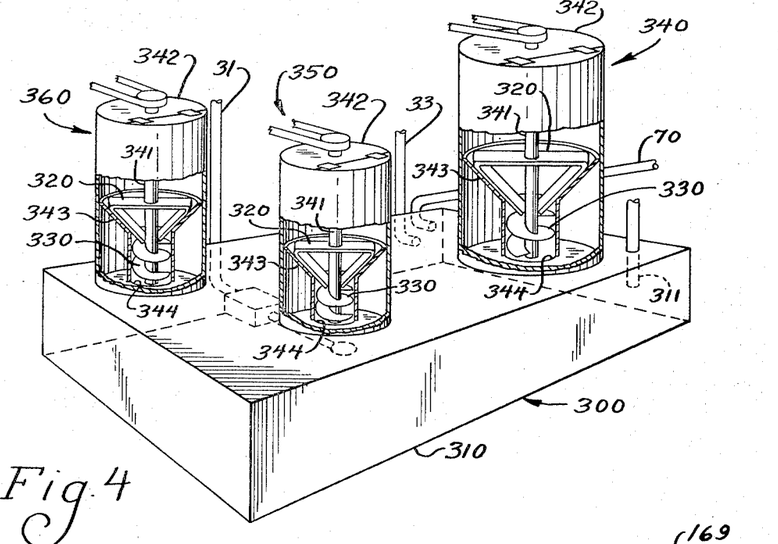
FIG. 4 is a frontal perspective view of the pre-mix chamber and filter aid supplying mechanisms.

When the desludger pump 30 is energized, its discharge line 31 is pressurized creating a positive pressure on control line 36 which is connected from the discharge line 31 to a diaphragm valve 37 positioned in the discharge line 117 between the outlet from the primary filter 100 and the inlet into the secondary filter or desludger 200. The pressurizing of control line 36 opens the diaphragm valve 37 holding the valve open as long as the desludger pump 30 is in operation. A float valve 235 is connected into the inlet to the desludger or secondary filtration system 200 and serves to regulate the flow of liquid thereinto and to maintain a proper fluid level in the desludging chamber 210. As best seen in FIG. 3, the inlet 209 to the desludger chamber is discharged into a turbulence suppressor 205 formed as a pocket defined by the chamber 210 and plates 211 to minimize the turbulence of the fluid entering the desludger apparatus.

As previously disclosed, the desludger pump 30 and feeder pump 40 are both actuated when the contents of the primary filter apparatus 100 are to be transferred to the desludger 200. The desludger pump 30 draws the liquid passed through the desludger filter elements 260 through the discharge line 31 into the pre-coat feeder apparatus 300. At the same time, the feeder pump 40 is withdrawing the contents of the pre-coat mixing chamber 310 through the feeder pump 40 and discharging the contents into an inlet opening 120 of the filter chamber 110. In order to maintain a fixed fluid level in the desludger chamber 210 and to prevent overflow occasioned by differentials in pump capacity of the desludger pump 30 and feeder pump 40, an overflow line 70 extends from the desludger chamber 210 to the mixing chamber 310 of the pre-coat apparatus 300. As the filter elements 260 of the desludger filter mechanism 250 collect the sludge and filter aids (added to the fluid in a manner to be hereinafter described in detail), the discharge capacity of the desludger pump 30 decreases while the input from the feeder pump 40 remains substantially constant. Therefore, it is necessary during re-circulation of the sludge and filter aid bearing liquid to provide an overflow re-circulation line to compensate for the changing flow rate capacity of the desludger pump 30.

The energization of feeder pump 40 pressurizes control line 41 connected to the feeder pump discharge line 42 between the outlet of the feeder pump and the inlet 120 into the primary filter chamber 110. The control line 41 is coupled to diaphragm valves 44 and 45 which are connected in the filter outlet line 40 and line 33, respectively. The pressure on control line 41 closes normally open diaphragm valve 44 and applies an opening force on normally closed diaphragm valve 45. However, a control line 61 coupled to diaphragm valve 45 from desludger pump 30 is sized such that the closing force exerted thereby on diaphragm valve 45 during operation of the desludger pump 30 is sufficient to maintain the valve in a closed position preventing the force applied by control line 41 from opening the valve. Pressure on the control line 41 closes diaphragm valve 44 and pressure by line 61 holds diaphragm valve 45 closed maintaining these valves in these respective positions as long as the feeder pump 40 and desludger pump 30 are energized. While operation of the diaphragm valves disclosed herein is by fluid pressure, other equivalent actuating devices such as air or electrically operated solenoid values may be used.

The closing of diaphragm valve 44 prevents the unclarified liquid passing from the outlet of primary filter mechanism 150 from being transferred out of the filtration system. The maintaining of valve 45 closed prohibits any fluid from being re-circulated through the filter chamber 110. Therefore, by circulating the liquid in this manner and having the diaphragm valves 44 and 45 closed, all sludge such as suspended or partially dissolved solids and expended filter cake are transferred into the secondary filter or desludger 200 in a self-contained closed system without contaminating any clean reservoirs.

The liquid being clarified through the desludger filter mechanism 250 passed through discharge line 31 flows into the mixing chamber 310 of the pre-coat feeder apparatus 300. A pre-determined amount of filter aids is added into the mixing chamber forming a slurry which is circulated into the primary filter chamber 110 through inlet 120 to be mixed with the sludge formed therein. This mixture is then passed to the desludger 200 to form a filter cake on the septum of the filter elements 250. The mixture of filter aids and sludge forms a pre-determined porosity filter cake protecting the septum of the desludger filter elements.

After the internal closed circulation system has re-circulated the liquid, the filter discs 150 of the primary filter are cleaned and prepared for further processing. The time necessary for this re-circulation is usually approximately 4 to 5 minutes and the process of accumulating the sludge on the filter elements 250 can be determined by noting the clarity of the liquid passing to the inlet of the desludger by means of a sight glass 201 positioned in the inlet line 117.

After the sludge transfer phase has been completed, the desludger pump 30, the feeder pump 40, and the filter drive 140 are de-energized de-pressurizing the control lines 36, 41 and 61 allowing the diaphragm valves to return to their unbiased or de-pressurized position.

PRE-COAT PHASE

Upon the completion of the sludge transfer phase described above, the filter pump 20 and feeder pump 40 are energized. Since the system has been closed through actuation of the diaphragm valve 44, the liquid in the closed system has been continuously re-circulated through the mixing chamber 310 of the pre-coat feeder apparatus 300, through the primary filter chamber 110 and the secondary filter mechanism 250 of the desludger 200 whereat all the suspended and partially dissolved solids and filter aids have been accumulated on the filter elements 260, the liquid in the closed system has been clarified and is ready for further use.

The filter pump 20 withdraws the clarified liquid from the filter clean liquid housing 60 discharging the liquid into the cone creating circulation through the filter mechanism 150 of the primary filter apparatus 100 and out through the clean liquid housing 60 back through the filter pump 20 and into the chamber 110 to form a self-contained closed circulation system. The feeder pump 40 withdraws liquid from the pre-coat chamber 310 through the feeder pump 40 discharging into the inlet 120 of the filter chamber 110 of the primary filter apparatus.

As the feeder pump 40 is actuated, the control line 41 connected to the discharge end of the feeder pump is pressurized opening diaphragm valve 45 and closing diaphragm valve 44 holding these valves in that position as long as the feeder pump is operating. The positioning of these valves forms a fluid circuit wherein the clarified liquid is circulated from the outlet of the filter mechanism 150 through diaphragm valve 45, check valve 43 in line 33 and into the mixing chamber 310 of the pre-coat feeder apparatus. The check valve 32 functions to prevent any discharged liquid from reversing flow and passing into the desludger.

To form the pre-coat or new filter cake on the filter septum 168 of the filter mechanism 150, as the feeder pump 40 is energized to actuate diaphragm valve 44 and 45 forming the closed circulation system, the feeder drive motor 80 is actuated to rotate agitator 320 and feed auger 330 within each of the filter aid hoppers 340, 350 and 360. The internal construction of each of the respective filter aid hoppers is the same and, therefore, for convenience of illustration the filter aid hopper 340 will be described in detail with reference numerals referring to similar apparatus in the other two hoppers.

The mixing or pre-coat chamber 310 is formed as a liquid-tight housing having a discharge outlet 311 coupled to the feeder pump 40. Each of the feeder drive motors 80 are suitably secured to the filter aid hoppers and connected by suitable drive elements to rotate a shaft 341 extending longitudinally within the feeder hopper and having secured thereto an agitator 320 and feed auger 330. The bottom of the hopper is formed in a conical shape 343 and secured within the hopper chamber 345 to prevent any of the material contained therein from being discharged except through the outlet 344 in the bottom of the cone. The shaft 341 is suitably journaled for rotation in a bracket secured to the walls of the filter aid hopper on the bottom, and in the top closure 342 of the hopper. A portion of the top closure is hinged so that it may be opened to replenish the filter aid material as necessary.

When the feeder drive motors 80 are energized, due to the gearing 81 and pitch of the feed auger 330, a controlled pre-measured amount of filter aid or media is added into the mixing chamber 310. by the turbulence of liquid within the mixing chamber, a slurry is formed which is pumped through the feeder pump 40 into the filter chamber 110 to pass through the filter element 160 whereat the filter aids or media are retained on the filter septum 168 to pre-coat the septum to form a new filter cake allowing the clarified liquid to be recirculated through the mixing chamber 310. When the pre-determined amount of filter aid or media has been added to the mixing chamber, the feeder drive motors 80 are de-energized but the feeder pump 40 continues to operate circulating the liquid from the pre-coat chamber 310 through the feeder pump and into the inlet 120 of the primary filter chamber 110. As the liquid containing the filter aid medium passes through the filter elements 160, the filter aid is retained on the septum of the filter elements and the liquid is re-circulated back through the mixing chamber. This re-circulation continues until the sight glass 47 positioned in discharge line 42 appears clear indicating that the filter elements 160 are completely pre-coated and the mixing chamber 310 of the precoat feeder apparatus has been completely cleansed.

After the pre-coat phase has been completed, the feeder pump 40 is de-energized and the diaphragm valve 44 and 45 returned to their original position. The filter pump 20 remains energized and the main pump 10 is again energized to pass unclarified liquid into the primary filter chamber 110 for clarification.

SLUDGE DISPOSAL PHASE

When the filtration system is again clarifying the liquid being pumped by the main pump 10 into the inlet 13 of the filter chamber 110 and out through the filter outlet 50, the float valve 235 in the desludger and 335 in the mixing chamber of the pre-coat feeder apparatus permits liquid to enter from the filter outlet as required to maintain the pre-determined level in both of these chambers. A control line 56 connected between the filter inlet line 11 and the line 117 connecting the primary filter chamber discharge 115 into the desludger inlet discharge 209 is connected below diaphragm valve 37 to allow partial circulation through the discharge outlet 115 during operation of the main pump 10 to prevent clogging or plugging of the line outlets and to maintain a continuous flushing action.

When the primary filter apparatus 100 is back on line with replenished filter elements 160 and the main pump 10 is withdrawing liquid to be clarified and discharging it (13) into the primary filter chamber 110, the secondary filter or desludger 200 automatically cleans the collected filter cake from the filter elements 260 and expels the expended material or sludge for disposal.

As the primary filter apparatus 100 begins its filtration phase, the drive motor 216 is activated rotating the filter mechanism 250 to effect relative movement between the filter elements 260 and the wipers 280 thereby removing the filter cake from the filter septum, and the horizontal auger 220 positioned within the desludger chamber 210. Simultaneously, the vertical auger drive motor 226 and the linkage connected thereto, is actuated rotating the center auger 230, cone scrapper 234 and vertical auger 240.

As best shown in FIG. 3, the bottom of desludger chamber 210 is formed in a conical shape (214) and sealed to prevent liquid from passing out of the chamber except through the bottom outlet 215. The center auger 230 is positioned within the outlet of the conical shaped bottom of the desludger chamber 210 and is rotatably supported therein with a portion of the shaft 231 extending outwardly from the water-tight end closure of the outlet 218 with a gear suitably secured thereto to form a portion of the vertical auger drive 226. The opposite end of the shaft 231 is connected to a horizontally extending bar of the cone scraper 234 which has downwardly turned ends extending substantially parallel to the conical shaped bottom 214.

The cone scraper 234 functions to eliminate sludge bridging or accumulation in the cone. The sludge material removed from the filter septum of the filter elements 260 sometimes has a tendency to accumulate at the cone and the knife edge or downwardly extending portion 236 functions to prevent accumulation of sludge on the cone walls.

The left-handed center auger 230 forces the sludge downward to the opening 217 in the bottom cone outlet whereat the sludge passes into the horizontal auger 220. The horizontal auger 220 is rotatably journaled within a tube 221 having one end enclosed and the other end in communication with the inlet to vertical auger 240. A portion of the auger shaft 222 extends outward of the closed end and is sealed to prevent the passing of material from the tube. The extending end of the shaft 222 is connected to a driven gear 213 which forms a portion of the combined drive mechanism 216.

As the sludge is fed downwards through the center auger 230 and into the horizontal auger 220 it is conveyed therefrom into the vertical auger 240. The vertical auger 240 is rotatably journaled in an end cap 241 which forms a fluid-tight enclosure of the column 242 in which the auger is positioned. A portion of the shaft 243 extends outward of the end cap and has a driven gear 245 secured thereto forming a portion of the vertical auger drive system 226. The column 242 is suitably secured to the outer portion of the desludger chamber 210 by brackets. The upper end of the column 242 is closed by a cap 246 having a bearing portion for receiving the uppermost end of the vertical auger shaft 243. The cap 246 is formed with a vent to allow vapors passing upward in the vertical auger to be suitably treated or released to the atmosphere depending upon the nature of the vapor material.

As sludge is fed into the vertical auger 240 by means of the horizontal auger 220, it is elevated through the auger flite and heated by means of steam jackets as shown or by any other suitable means such as an electrical resistance heater system. As shown in FIG. 2, two steam jackets 270 and 290 are carried by the column 242 and connected by valve supply and return lines such that either one or the other or both of the steam jackets may be utilized depending upon the nature of the sludge material passing upward in the column and the type of reclamation (semi-dry or dry discharge) which is desired. It has been found that heating of the vertical auger is necessary due to the mechanical action of the augers on the sludge, even if the sludge is at a very hard state. The action of the augers on the sludge, if the column is not heated, will mechanically work the material such that the sludge cannot be elevated by the auger, especially at very low speeds. Therefore, the heating of the auger evaporates excessive liquids to maintain the sludge in a state to be elevated. The vertical auger 240 has a portion 244 void of any auger flite.

In this manner, sludge being elevated by the auger forms a solid mass or plug at this portion preventing any excess liquid from flowing upward seeking its level relative to the fluid level within the desludger chamber 210. As shown (FIG. 2), the lower steam jacket 290 extends upwardly from below the outlet 217 of the conical bottom 214 and the upper steam jacket 270 extends above the top of the desludger chamber 210.

The heat from lower steam jacket 290 causes the liquid-solid material below the sludge plug to boil vaporizing the liquid within this portion of the column 242, an eventually draining the contents from the desludger chamber 210 due to this boiling process. The upper steam jacket 270 functions to control the amount of moisture retained in the sludge after the sludge plug is formed (at 244) and elevated by vertical auger 240 through the portion of column 242 adjacent steam jacket 290. By controlling the heat applied through steam jacket 270, the sludge can be expelled in varying states of dryness.

For best results the operation of the vertical auger 240 should be intermittent such that the heat will have an opportunity to dry the sludge over an extended period of time as it is sequentially elevated. When the sludge reaches the top of the vertical auger, a deflector guide 248 secured to the top portion of shaft 243 and rotatable therewith directs the sludge out from the column into the dry sludge chute 275 whereat it is discharged into a suitable receptacle 90 for disposal.

Upon initial start up or when sludge is not present within the vertical auger column 242, it is preferable to add a quantity of filter aid medium into the column to form a initial plug at portion 244 of auger 240. In this manner, a plug of material will be present to facilitate sludge removal. While FIG. 2 illustrates one void (244) in auger 240, it is sometimes preferable that two, three or more void portions be formed depending upon the specific application in which the desludger apparatus is utilized.

The sludge plug formed at the auger void functions to squeeze or press the liquid from the solids as additional sludge is conveyed upwardly against the bottom of the plug elevating the sludge at the topmost portion of the plug thereby squeezing the liquid therefrom. In those applications wherein the vertical auger has two or more void portions to form sludge plugs, the lower plugs act as a series of filters removing suspended solids from the liquid passing therethrough. The passage of liquid through the lower plugs will depend upon the position of the void created plug and, therefore, the pressure head exerted thereagainst due to the liquid level within the desludger chamber 210. As the liquid level within the desludger chamber 210 decreases, the lower filter-acting plugs will function as the upper plug, removing the liquid from the sludge by the pressing or squeezing action exerted by the sludge beneath the plug.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that this invention not be limited to the particular embodiment disclosed as the best mode contemplated for carrying out this invention, but that the invention will include all embodiments falling within the scope of the appended claims.

What is claimed is:

1. A method of clarifying a contaminated liquid and disposing of the contaminants comprising the steps of
    passing an unclarified liquid through a primary filter removing the contaminants therefrom and discharging the liquid clarified thereby into a discharge outlet,
    interrupting the discharging of the clarified liquid in response to the accumulation of a predetermined level of contaminants on the primary filter,
    removing the accumulated contaminants from the primary filter into the unclarified liquid,
    passing the unclarified liquid bearing the contaminants through a secondary filter to accumulate the contaminants thereon and discharging the liquid clarified thereby into a chamber,
    interrupting the passing of liquid through the secondary filter upon the accumulation of the contaminants thereon,
    adding a quantity of filter forming material to the clarified liquid passed into the chamber and circulating the filter material bearing liquid through the primary filter to renew the filtering elements thereof,
    removing the accumulated contaminants from the secondary filter, and conveying the accumulated contaminants from the secondary filter to a vertically disposed auger means which is in direct communication with the secondary filter means, the contaminants entering the auger adjacent the bottom thereof,
    heating said contaminants in said auger means to vaporize at least a portion of the liquid in said contaminants, the portion of liquid remaining in said contaminants being sufficiently small so that the contaminants can be elevated by the auger means at relatively slow speeds of rotation of said auger means,
    a portion of the flight of the auger means being removed at at least one position spaced from the bottom thereof,
    elevating the heated contaminants in said auger means while allowing liquid therein to drain by gravity,
    forming at least one plug of the contaminants being elevated at said position, and
    discharging substantially dry contaminants at the top of the auger means.

2. The method of claim 1 wherein the step of interrupting the discharge of clarified liquid to the discharge outlet in response to the accumulation of a predetermined level of contaminants on the primary filter is in response to the sensing of a predetermined pressure drop through the primary filter.

3. The method of claim 1 wherein the step of removing the accumulated contaminants from the primary filter into the unclarified liquid includes brushing the outer surface of said primary filter.

4. The method of claim 1 further including adding a quantity of filter forming material to the liquid passed from the filtration system to facilitate accumulation of the contaminants and expended filter material by the filter means.

5. The method of claim 1 wherein the step of adding a quantity of filter forming material to the clarified liquid passed into the chamber and circulating the filter material bearing liquid through the primary filter to renew the filtering elements continues until substantially all of said filter forming material is removed from the clarified liquid to the primary filter.

6. The method of claim 1 wherein the step of removing and collecting the accumulated contaminants from the secondary filter comprises brushing the outer surface of said secondary filter to remove filter cake formed thereon, and gravitationally separating the filter cake removed from said secondary filter.

7. The method of claim 1 wherein the step of forming a plug of contaminants during the upward conveying comprises forming a series of contaminant plugs to filter a portion of the suspended solids from the liquid.

8. The method of claim 1 wherein the step of forming a plug of contaminants during the upward conveying includes preventing liquid below the plug from rising to a level above the plug of contaminants.

9. The method of claim 1 wherein the step of forming a plug of contaminants during the upward conveying includes squeezing the plug of contaminants to remove liquid therefrom.

10. The method of claim 7 wherein the step of forming a series of contaminant plugs to filter a portion of the suspended contaminants from the liquid comprises filtering the suspended contaminants through the lowermost plug and squeezing the uppermost plug of contaminants to remove liquid therefrom.

11. The method of claim 1 wherein the upward conveyance of said contaminants through the auger means is periodically interrupted to facilitate removal of liquid conveyed therewith.

12. A method of fluid pollution control comprising the steps of passing an unclarified fluid having dissolved and suspended contaminants therein through a first filter cake bearing filtration means clarifying the fluid and retaining the contaminants on the filter cake, discharging the clarified fluid to a discharge outlet, interrupting the discharge of clarified fluid and the passing of unclarified fluid in response to the accumulation of a predetermined quantity of contaminants on the filter cake, removing the filter cake and contaminants retained thereon from the first filtration means into suspension in the unclarified liquid.

withdrawing the unclarified liquid and expended filter cake from the first filtration means, passing said liquid and filter cake through a second filtration means clarifying the liquid thereby and discharging said liquid, adding a quantity of filter cake forming material to said discharged liquid, circulating said liquid bearing the filter cake forming material and the unclarified liquid bearing the suspended filter cake through the second filtration means forming a filter cake thereon and clarifying the liquid passing therethrough by removing substantially all of the filter cake forming material and suspended filter cake from the liquid to the second filtration means, interrupting the withdrawal of liquid from the first filtration means upon the clarification thereof, adding a second quantity of filter cake forming material to the clarified liquid, circulating said liquid bearing the second quantity of filter cake forming material through the first filtration means forming a new filter cake thereon and clarifying the liquid by removing substantially all of the filter cake forming material from the liquid to the first filtration means, resuming the passing of unclarified fluid having dissolved and suspended contaminants therein through said first filtration means to be clarified thereby and the discharging of said clarified fluid to a discharge outlet upon the formation of said new filter cake on said first filtration means, removing the filter cake formed on the second filtration means, collecting the removed filter cake and conveying said filter cake from the second filtration means to a vertically disposed auger means which is in direct communication with the second filtration means, the filter cake entering the auger adjacent its bottom, heating the filter cake in the auger means to vaporize at least a portion of the liquid in said filter cake so that the remaining cake can be elevated by the auger means at relatively slow speed of rotation of said auger means, at least a portion of the flight of the auger means being removed at at least one position spaced from the bottom of the auger means, elevating the heated filter cake in said auger means while allowing liquid therein to drain by gravity, forming at least one plug of the filter cake being elevated at said position, and discharging substantially dry cake at the top of said auger mean.

13. The method of claim 12 wherein the liquid clarified by circulating said unclarified liquid bearing the suspended filter cake through the second filtration means is discharged therefrom into a pre-coat feeder chamber for the addition of the filter cake forming material.

14. Apparatus for clarifying a liquid having suspended and dissolved contaminants therein comprising means for passing contaminant bearing liquid through a first filtration means, a first filtration means carried within a primary filter chamber including a plurality of hollow mesh filter elements supporting a filter cake material on the surface thereof to remove the suspended and dissolved contaminants from said liquid and discharge the liquid clarified thereby to a discharge outlet, condition responsive means actuable in response to the accumulation of contaminants by said filter cake material to interrupt the passing of contaminant bearing liquid therethrough, means for removing the filter cake and accumulated contaminant from said filter elements into suspension in the contaminant bearing liquid.

a vacuum pump for withdrawing the contents of the primary filter chamber into a secondary filter chamber and through a second filtration means, a second filtration means carried within a secondary filter chamber including a plurality of hollow mesh filter elements supporting a filter cake material on the surface thereof to remove the suspended filter cake and contaminants from the liquid passed therethrough and discharge the liquid clarified thereby into a pre-coat chamber, a pre-coat chamber for receiving the clarified liquid discharged from said second filtration means, means for adding a predetermined quantity of filter cake material into said pre-coat chamber to be mixed with the clarified liquid contained therein, means for interrupting the passing of liquid through said second filtration means upon the clarification thereof and circulating the clarified liquid containing the filter cake material through said first filtration means to form a new filter cake on the surface of said filter elements, means actuable upon the interruption of liquid passing through said second filtration means to remove the filter cake from the filter elements, conveyor means to accumulate and remove said filter cake from the secondary filter chamber to a vertically disposed auger means in direct communication with said secondary filter chamber, said conveyor means conveying said filter cake to the auger means adjacent the bottom thereof, heating means in thermal contact with said auger means for vaporizing at least a portion of the liquid in said filter cake so that the auger means is capable of elevating the filter cake at a relatively slow speed of rotation, a portion of the flight of said auger means being removed at at least one position spaced from the bottom thereof for forming a plug of filter cake at said position, means at the top of said auger means for discharging said filter cake.

15. The apparatus of claim 14 wherein said first and second filtration means each comprise a plurality of coaxial hollow discs having an outer mesh surface forming a septum for support of a filter cake.

16. The apparatus of claim 14 wherein said condition responsive means includes a pressure sensitive switch actuable in response to the increase in pressure required to pass unclarified fluid through said first filtration means.

17. The apparatus of claim 14 wherein the means for removing the contaminants accumulated by said first filtration means comprise brush means positioned in contact therewith for mechanically separating the contaminants therefrom.

18. The apparatus of claim 14 wherein said means for adding a predetermined quantity of filtration means forming material comprises a container for holding a quantity of filtration means forming material, scraper means carried within said container and moveable through the contents contained therein to prevent agglomerating of the filtration means forming material, and an auger rotatably carried within said container to remove a predetermined quantity of the filtration means forming material in response to the rotation thereof.

19. the apparatus of claim 14 wherein said heated vertical auger has a plurality of auger flight portions removed to form a series of accumulated sludge plugs.

20. The apparatus of claim 14 wherein said heated portion of said vertical auger extends at least from a point below the bottom outlet of said secondary filter chamber to at least a point above said secondary filter chamber.

21. The apparatus of claim 14 wherein said heated portion of said vertical auger extends upwardly at least from a point below the bottom outlet of the secondary filter chamber.

22. The apparatus of claim 14 wherein said heated vertical auger is enclosed by a plurality of selectively actuable heating means to control the temperature thereof.

23. The apparatus of claim 22 wherein said plurality of selectively actuable heating means comprise steam jackets.

24. The apparatus of claim 22 further including deflector means carried by said auger to remove the sludge therefrom.

25. The apparatus of claim 14 wherein said conveyor means conveying said filter cake to the auger means adjacent the bottom thereof includes scraper means carried within said secondary filter chamber and movable through the contents contained therein to prevent filter cake from adhering to the secondary filter chamber.

26. The apparatus of claim 25 wherein said conveyor means includes a vertically disposed auger means carried within said secondary filter chamber.

27. The apparatus of claim 26 wherein said conveyor means includes a horizontally disposed auger means in direct communication with said vertically disposed auger means within said secondary filter chamber.

28. The apparatus of claim 26 wherein said scraper means is carried by said vertically disposed auger means carried within said secondary filter chamber for rotational movement therewith.

29. The apparatus of claim 14 wherein the bottom of said secondary filter chamber is conically-shaped to facilitate passage of said filter cake to said conveyor means.

* * * * *